(12) United States Patent
Ishii

(10) Patent No.: US 11,422,371 B2
(45) Date of Patent: Aug. 23, 2022

(54) AUGMENTED REALITY (AR) DISPLAY

(71) Applicant: Fusao Ishii, Pittsburgh, PA (US)

(72) Inventor: Fusao Ishii, Pittsburgh, PA (US)

(73) Assignee: Fusao Ishil, Pittsburgh, PA (US)

( * ) Notice: Subject to any disclaimer, the term of this patent is extended or adjusted under 35 U.S.C. 154(b) by 8 days.

(21) Appl. No.: 16/255,799

(22) Filed: Jan. 23, 2019

(65) Prior Publication Data

US 2020/0004019 A1     Jan. 2, 2020

Related U.S. Application Data

(60) Provisional application No. 62/692,699, filed on Jun. 30, 2018.

(51) Int. Cl.
| | |
|---|---|
| *G02B 27/14* | (2006.01) |
| *G02B 27/10* | (2006.01) |
| *G02B 27/02* | (2006.01) |
| *G09G 5/00* | (2006.01) |
| *H04N 7/00* | (2011.01) |
| *G02F 1/1335* | (2006.01) |
| *G02B 27/01* | (2006.01) |
| *G06T 19/00* | (2011.01) |
| *G02B 27/09* | (2006.01) |
| *G02B 3/08* | (2006.01) |

(52) U.S. Cl.
CPC ............ *G02B 27/0172* (2013.01); *G02B 3/08* (2013.01); *G02B 27/0977* (2013.01); *G06T 19/006* (2013.01); *G02B 2027/0178* (2013.01)

(58) Field of Classification Search
CPC ....... A61B 3/113; A61B 3/103; A61B 3/1225; B60R 1/00; G01S 11/12; G01S 1/02; A01B 69/001; G02B 27/144; G02B 27/0172; G02B 27/145; G02B 27/1013; G02B 27/0149; G02B 27/0103; G02B 27/0101; G02B 27/017; G02B 27/01; G09G 3/003; H04N 7/18; G06T 19/00; G06T 19/006; G05D 1/0038; G05D 1/0246
USPC ..... 359/629–636, 618, 639, 13–14; 345/7–9, 345/632–633, 207; 348/113–120; 349/11; 351/210, 221, 200
See application file for complete search history.

(56) References Cited

U.S. PATENT DOCUMENTS

| | | | |
|---|---|---|---|
| 2011/0213664 A1* | 9/2011 | Osterhout | G06F 3/013 705/14.58 |
| 2014/0204185 A1* | 7/2014 | Liu | H04N 13/302 348/54 |
| 2014/0250578 A1* | 9/2014 | Murphy | E03D 11/00 4/420 |
| 2017/0045743 A1* | 2/2017 | Dobschal | G02B 27/017 |
| 2017/0293143 A1* | 10/2017 | Martinez | G02B 27/01 |
| 2019/0033598 A1* | 1/2019 | Yang | G02B 27/0955 |

* cited by examiner

*Primary Examiner* — Dawayne Pinkney
(74) *Attorney, Agent, or Firm* — Bo-In Lin

(57) ABSTRACT

A projection display having an optical waveguide for a see-though display system using Fresnel mirrors is disclosed. A display using this waveguide enables high resolution, free from chroma aberration, wide viewing angle, large eye-box and very compact size.

18 Claims, 21 Drawing Sheets

AUGMENTED REALITY (AR) DISPLAY

CROSS REFERENCE TO RELATED APPLICATIONS

This application is a Non-Provisional Application which claims the Priority Date of previously filed Provisional Applications 62/692,699 filed on Jun. 30, 2018 and is also a Continuation in Part Application from a previously filed Non-Provisional Application, Ser. No. 14/999,458 filed on May 9, 2016.

TECHNICAL FIELD

This invention relates to a see-through display for projecting an image through a thin waveguide using minute prisms. This display works as a periscope with a thin waveguide combined with prisms or Fresnel lenses having reflective surfaces. This display is suitable for see-through head-up-displays for automobile and wearable displays as well as eye-glass displays having a wide viewing angle (Field of View or FOV) and a large eye-box.

BACKGROUND

See-through displays get attention in recent years especially for head-up-displays and wearable displays after smart phones are well accepted by the market. See-through displays provide hands free operation as well as showing an image in the distance same as regular sight. There are tremendous needs for see-through displays. See-through displays using hologram were proposed with some successful results. However in the past, see-through displays using hologram have not necessarily satisfied viewers, because they were often too low resolution, too low light utilization efficiency, not enough viewing angle and difficulty to eliminate unnecessary high order diffraction which ends up with ghost images. There are needs of optical systems enabling light, small, bright, high resolution and see-through. This invention provides a new optical system which satisfies all of these needs using conventional display devices such as LCD, LCOS, OLED, Micromirror, and Laser Beam Scanner.

As shown in FIG. 1, Freedman disclosed in U.S. Pat. No. 777,960 a head-up-display using Fresnel lenses to divert the direction of image reflection, but this does not reduce the size of display.

As shown in FIG. 2, Voloschenko et al. disclosed in U.S. Pat. No. 7,031,067 a head-up-display built in a dashboard of a car. This does not reduce the size of display.

As shown in FIG. 3, Kasai et al. disclose in U.S. Pat. No. 7,460,286 an eye glass type display system that implements see-through capability with a holographic optical element. This system can reduce the size of display substantially. But this system requires hologram and the efficiency of light utilization is low and it is difficult achieve high resolution or a large viewing angle.

As shown in FIG. 4, Mukawa et al. in SID 2008 Digest, ISSN/008-0966X/08/3901-0089, "A Full Color Eyewear Display using Holographic Planar Waveguides", disclosed an eye glass type display system that implements see-through capability with two holographic optical elements. This system can reduce the size of display substantially. But this system requires hologram and the efficiency of light utilization is low and it is difficult to achieve high resolution or large viewing angle.

As shown in FIG. 5, Saarikko, et al. disclosed in Patent Application Publication US2016/0231568, a wave guide using a diffraction surface to enable a see-through display. This display requires a large "fold" area to create a large eye-box which limits the viewing area for a viewer and diffraction requires a careful adjustment of phase changes by grating surface and color chroma-aberration is unavoidable if wide spectrum light sources are used.

As shown in FIG. 6, Takagi, et al. disclosed in U.S. Pat. No. 8,780,447 an optics enabling a see-through display forming a virtual image using a half mirror. This optics has a limitation to reduce the thickness of waveguide because of the single plane mirror. Products using this optics are commercially available for a while successfully.

As shown in FIG. 7, Amitai (U.S. Pat. No. 7,672,055) discloses a see-through display using a waveguide having a dichroic mirror fabricated with plates with tilted angular surface. This structure has the limitation of field of view due to the thickness of waveguide.

Because of portability, hands-free and safety issues, a see-through wearable display is gaining popularity, but wearable see-through displays as compact as regular glasses, high resolution, large field of view and large eye-box are not yet in the market and the demand for this technology is long waited. This invention provides one which satisfies these needs.

SUMMARY OF THE INVENTION

This invention discloses a unique and very compact see-through display suitable for eye-glass type display, head-up display and thin projection display. This display comprises 1) a projector (801), 2) a light pipe (803) with in-coupling prism (802), 3) folding mirrors with saw-teeth shaped prisms (805) and 4) out-coupling waveguide (807) as shown in FIG. 8.

The projector (801) comprises an LCD, a micromirror device or an OLED display device and a lens set which is similar to that of mobile phone cameras. A prism is used for in-coupling optics (1003 in FIG. 10) to lead the light beams from the projector into the light pipe (1004). A telecentric optics (1002) is more suitable for projection optics, although mobile phone cameras use non-telecentric lenses. After the in-coupling prism, the light beams are inputted into a light pipe (1101 in FIG. 11 or 1203 in FIG. 12). The light beams in the pipe as in FIG. 11 have to be folded or bent about 90 degrees toward the out-coupling waveguide (807). A surface of the light pipe (1101) receives only one direction of light beam (1105) from each of pixels in the display device. However this type of light pipe is too large and occupies too much space. The disclosed displays in the prior art suffer this space and this invention can provide substantially smaller light pipe. Because this invention does not use diffraction, chroma-aberration does not exist after the projection lens and a single out-coupling waveguide is enabled rather than 3 layers of waveguide as the prior arts.

An aspect of this invention is to provide a new and improved display system that includes a display device and a projection lens set for projecting a light to a light pipe. The system further includes an in-coupling prism to direct the light rays from the display device and projection lens set into the light pipe. The system further includes an out-coupling waveguide and folding mirrors to reflect the light rays from the light pipe to the out-coupling waveguide wherein the light pipe has a rectangular cross-section and the surfaces of the sides of the light pipe are reflective by coating or totally internal reflection (TIR) except an opening and the light rays can exit from the light pipe through the opening toward the folding mirrors which have saw-teeth shaped mirrors to reflect the light rays to the out-coupling waveguide and wherein the out-coupling waveguide has multiple saw-teeth shaped mirrors and reflects the rays toward the eye of a viewer. In another preferred embodiment, the projection lens set is telecentric and the principal rays emitted from the display device are substantially perpendicular to the surface of the display device and the principal rays from pixels cross each other at the inside or close to the in-coupling prism. In another preferred embodiment, the in-coupling prism has a reflective surface and the reflective surface receives light rays from the projection lens set and reflects the light rays into the light pipe and the normal vector of the reflective surface is between 15 and 45 degrees with respect to the optical axis of the projection lens set. In another preferred embodiment, the in-coupling prism has a reflective surface and the reflective surface receives light rays from the projection lens set and reflects the light rays into the light pipe and the normal vector of the reflective surface is rotated to form an angle between 30 and 60 degrees with respect to the long side of the light pipe. In another preferred embodiment, the refractive index of the in-coupling prism and light pipe is over 1.4. In another preferred embodiment, the size of the opening varies by location along the long side of the light pipe. In another preferred embodiment, the folding mirrors are tilted between 15 and 45 degrees with respect to the top surface of the light pipe and the normal vector of the folding mirror are set so that the light ray parallel to the optical axis at the projection lens will be substantially parallel to the normal vector of the top surface of the light pipe. In another preferred embodiment, the folding mirrors are tilted between 15 and 45 degrees with respect to the top surface of the light pipe and the normal vector of the folding mirror are set so that the light ray parallel to the optical axis at the projection lens will be substantially parallel to the normal vector of the top surface of the light pipe. In another preferred embodiment, the out-coupling waveguide has a slant side forming a prism where light rays are entering and the normal vector of the slant side is between 15 and 45 degrees with respect to the top surface of the light pipe so that the light rays from the folding mirrors can be reflected into the out-coupling waveguide. In another preferred embodiment, the out-coupling waveguide has a slant side forming a prism where light rays enter and the normal vector of the slant side is between 15 and 45 degrees with respect to the top surface of the light pipe so that the light rays from the folding mirrors can be reflected into the out-coupling waveguide. In another preferred embodiment, the out-coupling waveguide has multiple saw-teeth shaped mirrors which reflect the light rays from the folding mirrors toward the eye of viewer and the flat region, where no Fresnel mirrors exist, reflects the light rays by TIR (totally internal reflection) and transparent so that external light can reach the viewer's eye and the saw-teeth shaped mirror region has reflective coating. In another preferred embodiment, the light pipe and/or out-coupling waveguide has a layer(s) which partially reflect light to reduce unilluminated areas. In another preferred embodiment, the surface of the out-coupling waveguide has a curved envelope of multiple flat surfaces so that internally reflected light beams have the same angles as those of a totally flat surface. In another preferred embodiment, the angles of multiple saw-teeth shaped mirrors of the out-coupling waveguide varies by location so that an image is focused at a finite distance. In another preferred embodiment, there are multiple sets of the display system are overlaid so that images in multiple distances can be seen.

DETAIL DESCRIPTIONS OF THE PREFERRED EMBODIMENTS

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced or designed without these specific details. In other instances, well-known methods, procedures, components, and circuits have not been described in detail so as not to unnecessarily obscure aspects of the embodiments.

The technical solution of the present disclosure will be clearly and completely described in the following with reference to the accompanying drawings. It is obvious that the embodiments to be described are examples and only a part rather than all of the embodiments of the present disclosure. All other embodiments obtained by persons skilled in the art based on the described embodiments of the present disclosure shall fall within the protection scope of the present disclosure The objective of this invention is to achieve a see-through display which has a wide field of view (FOV) over 60 degrees (or +/−30 degrees) horizontally and an eye-box as large as 15 mm and resolution as high resolution as 4K with compact size to fit in eye-glasses to satisfy the needs and desires of viewers. An Augmented Reality or AR display satisfying all of the above specifications can be achieved by this invention. Eye-relief is defined as the distance between a combiner (combiner is a device to combine a real external image and a generated image. In this application, out-coupling unit of waveguide is combiner). Eye-relief is typically from 8 mm to 15 mm depending on true or fake eyelash. The diameter of eyeball is approximately 1 inch or 25 mm and an eyeball rotates around the center of sphere. If the eye-relief of a viewer is 15 mm and the viewer stares at the edge of FOV, the eyeball rotates about 30 degrees and an image must be visible with this condition. This requires the size of eye-box more than 13 mm horizontally.

Figure 1:
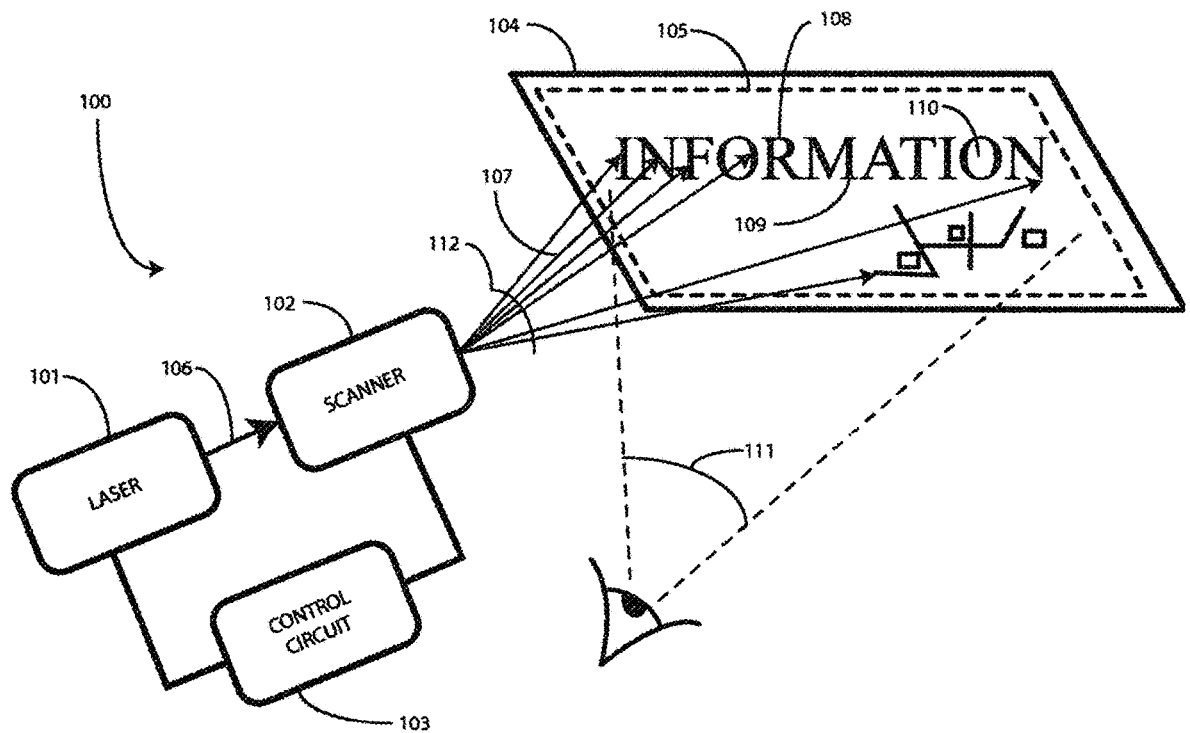
FIG. 1 shows a head-up-display with a reflecting screen having Fresnel lens, which was published as a US patent. This mirror changes the direction of reflection from a conventional mirror, but does not reduce the size of display system.
Figure 2:
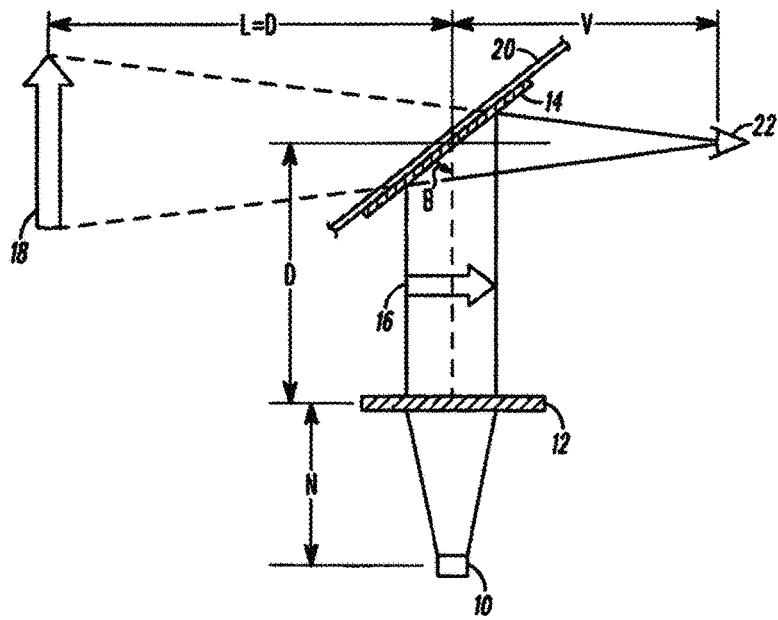
FIG. 2 shows another head-up-display buried in a dashboard which requires a large space.
Figure 3:
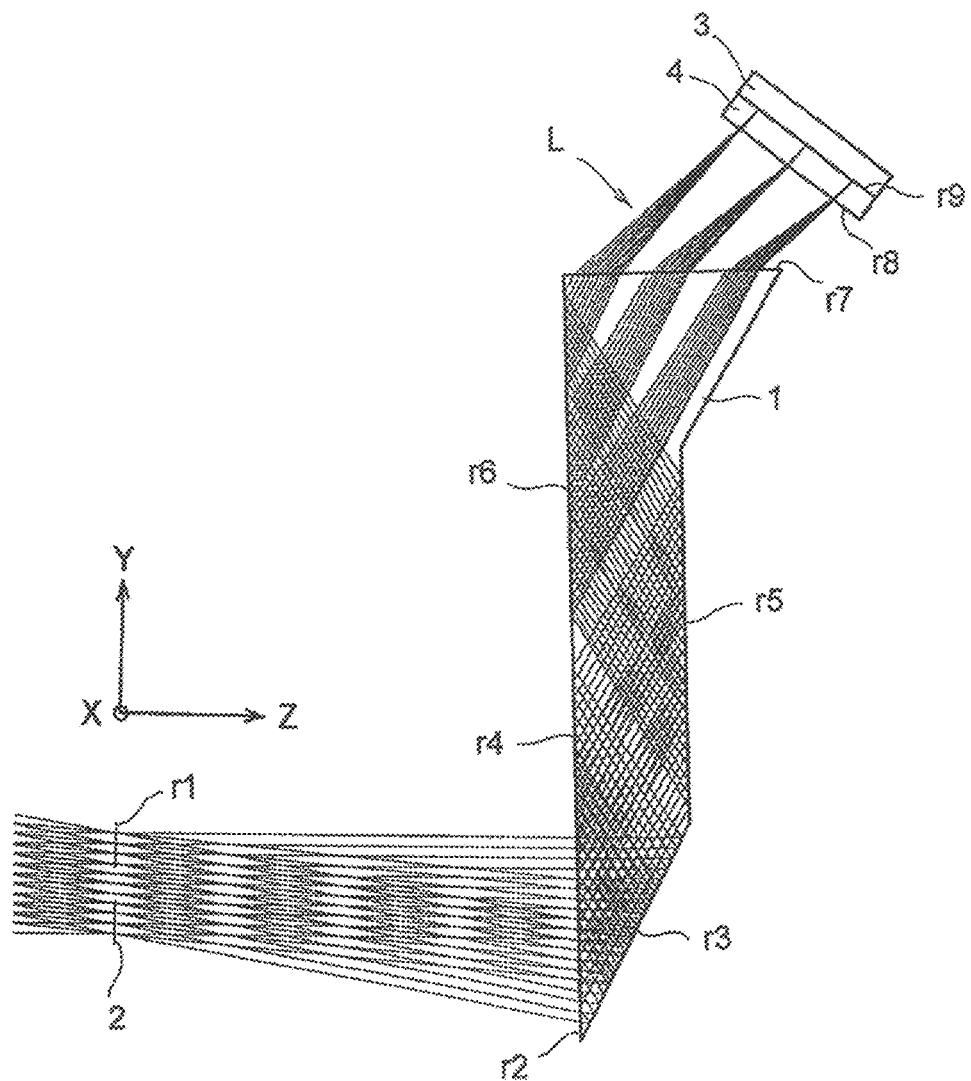
FIG. 3 is a cross sectional view of an image display system of a prior art shown by Kasai in his published technical report related to U.S. Pat. No. 7,460,286.
Figure 4:
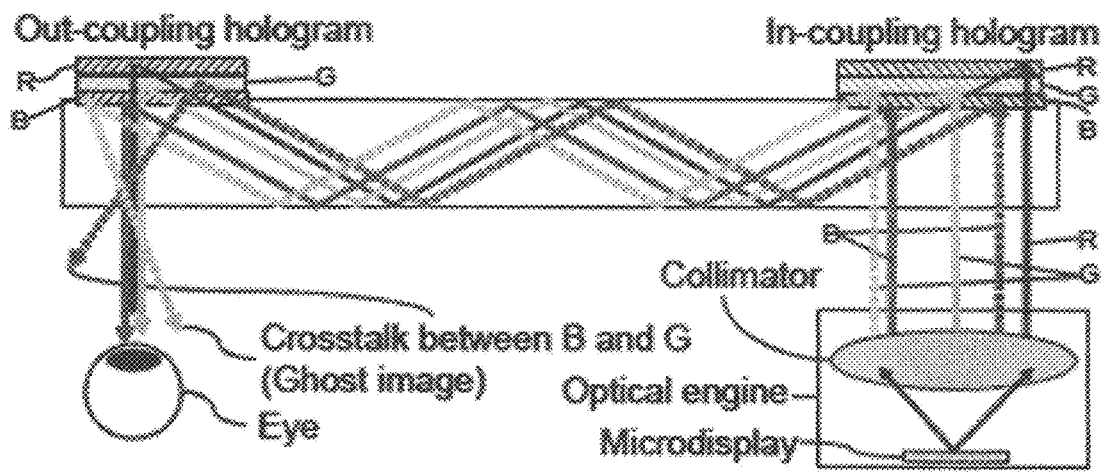
FIG. 4 is shown by Mukawa et al. in SID 2008 Digest, ISSN/008-0966X/08/3901-0089, "A Full Color Eyewear Display using Holographic Planar Waveguides". A wearable display as shown in FIG. 4 successfully demonstrated the display has a see-through capability.
Figure 5:
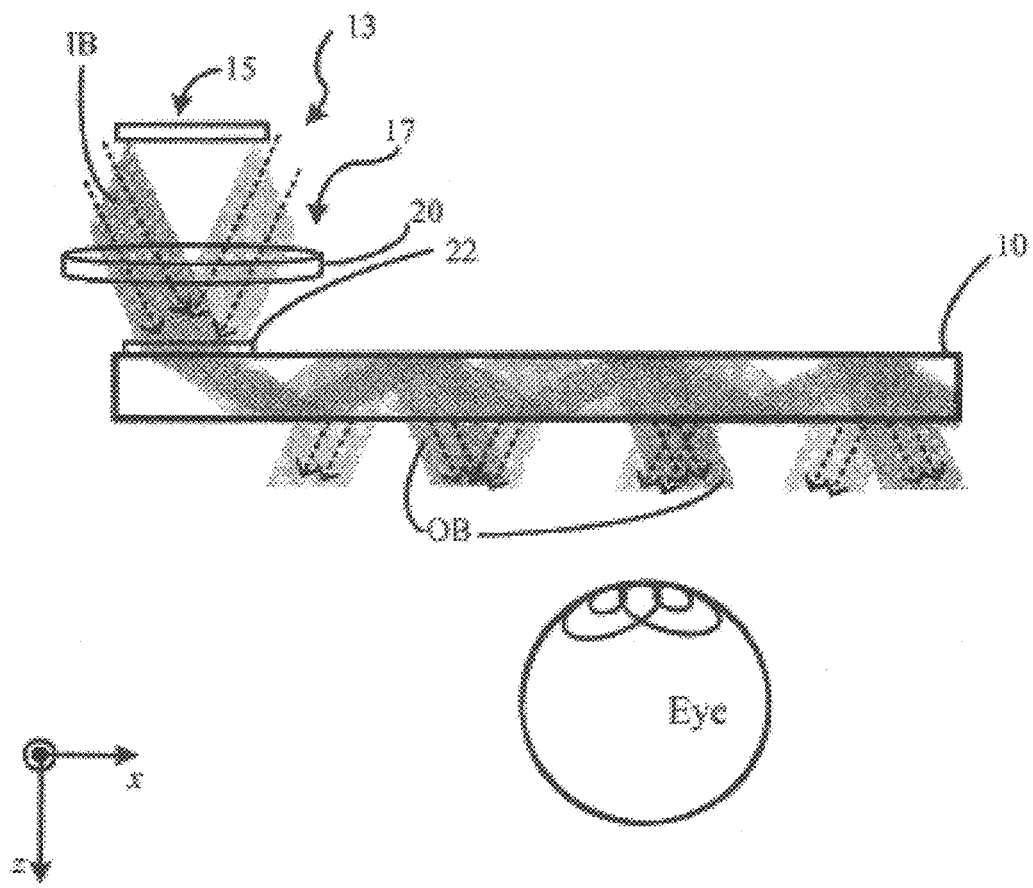
FIG. 5 is another see-through display disclosed in US Application US20160231568 that uses diffraction grating for both in-coupling and out-coupling.
Figure 6:
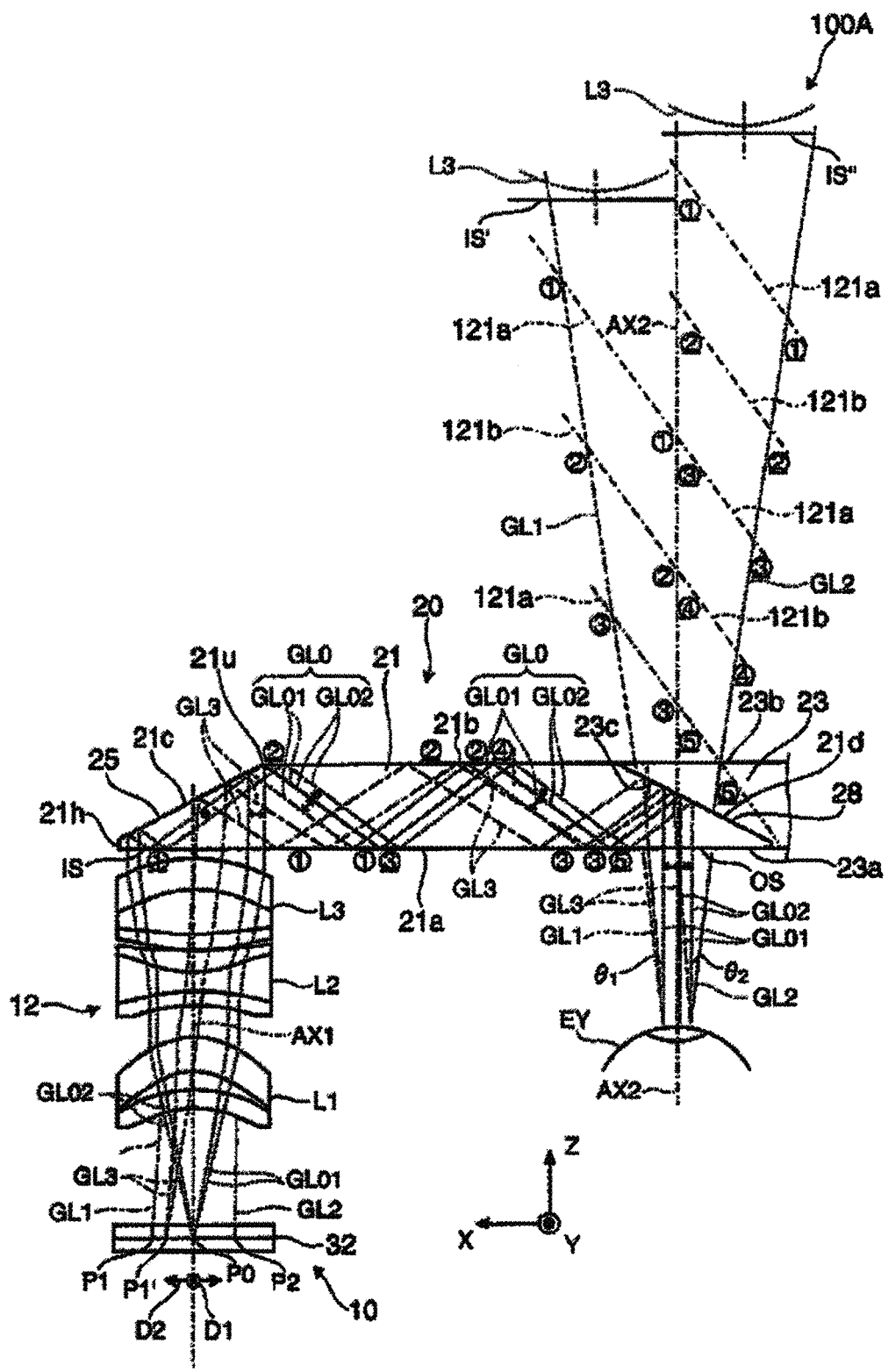
FIG. 6 shows an optics enabling see-through display by forming a virtual image using a half mirror disclosed by Takagi, et al. in U.S. Pat. No. 8,780,447.
Figure 7:
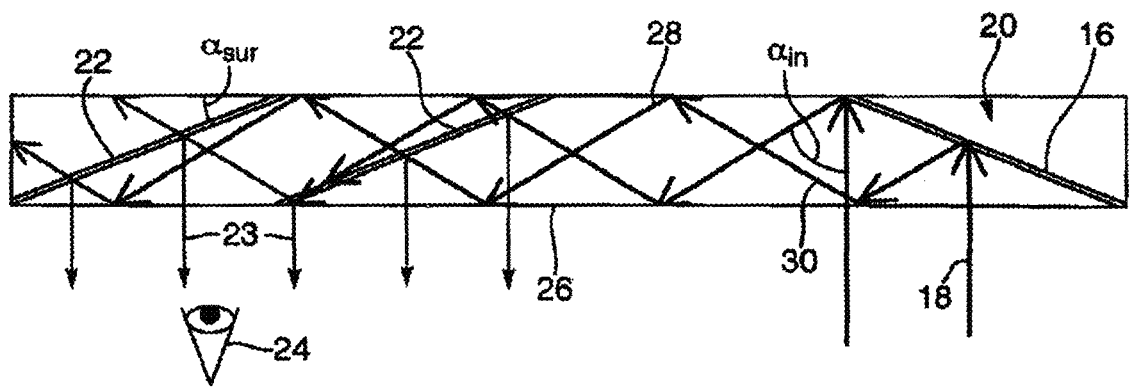
FIG. 7 is another see-through display disclosed by Amitai et al. that includes optics using dichroic coating extends over the entire thickness of waveguide.
Figure 8:
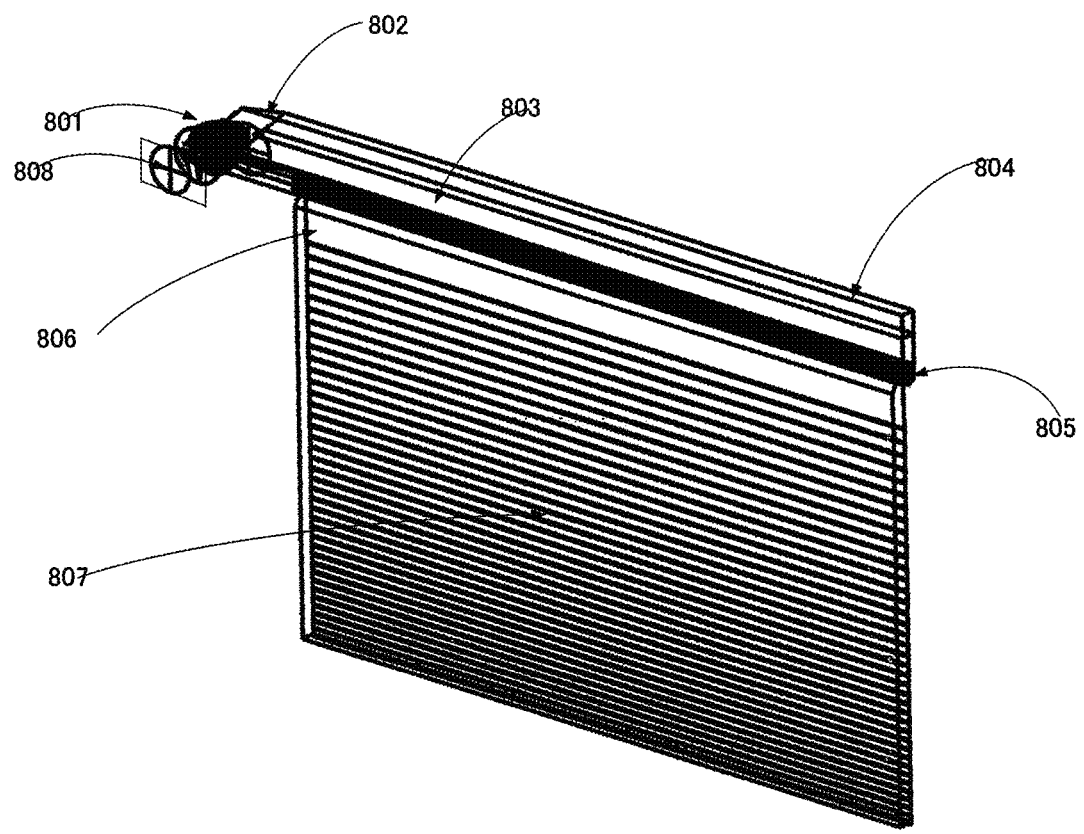
FIG. 8 is an exemplary embodiment of this invention showing an eye-glass type display.

An exemplary embodiment of this invention is shown in FIG. 8. A display having an array of pixels is placed at (808) and a set of projection lens (801) is placed. Light rays are projected on a prism (802) and inputted to a light pipe (803). The light rays propagate into the light pipe (803) and only the light rays having the same direction as the original rays from the prism (802) are selected and lead to folding mirrors (805). The light rays are reflected by the folding mirrors about 90 degrees toward an out-coupling waveguide (807). The light rays are reflected toward a viewer's eye by saw-teeth shaped Fresnel mirrors in the out-coupling waveguide. The detail of each block will be explained in the following paragraphs.

Figure 9:
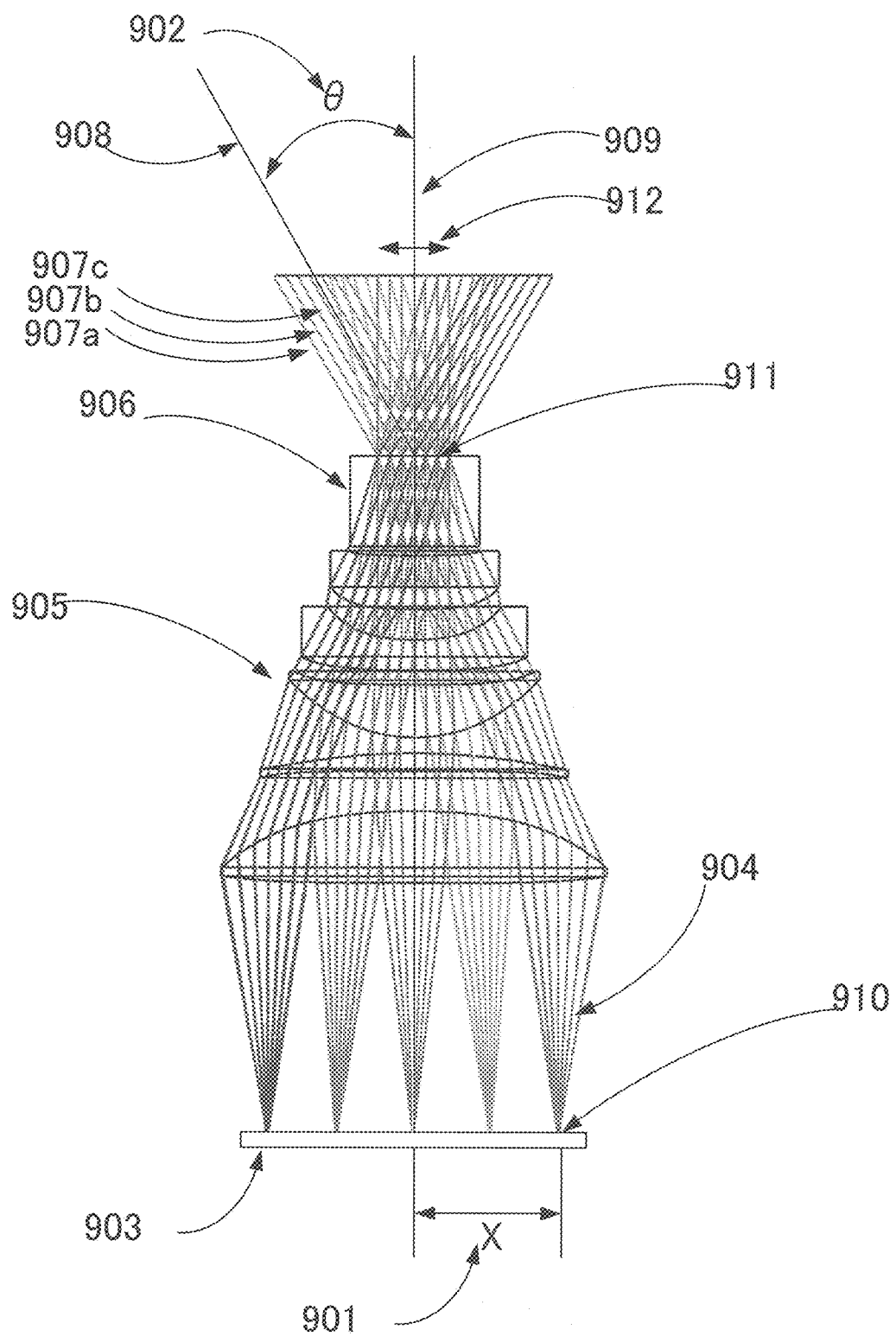
FIG. 9 illustrates a projection display device and a projection lens set.
Figure 10:
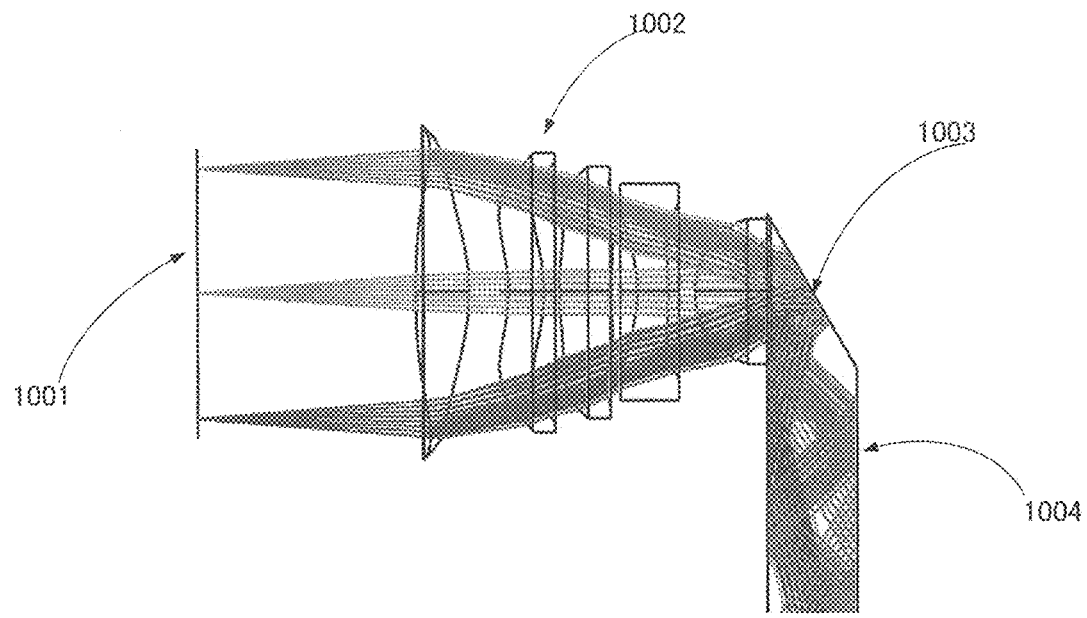
FIG. 10 illustrates an in-coupling optics introducing light beams into a waveguide.

An exemplary embodiment of this invention in-coupling optics is shown in FIG. 9. A display device (903) is placed and the display device emits light beams (904) to a set of projection lenses (905). This lens set is designed as a telecentric optics meaning that the principal ray of light beams (904) from each pixel of the display device entering the projection lens set are substantially parallel to the optical axis (909) of the projection lens set. This lens set has to be designed as an image is focused at an infinite or substantially far distance so that all of the rays projected from a single pixel are substantial parallel each other as shown in 907a, 907b and 907c. This optics ensures that all the rays from a single pixel are parallel. This is a key principle to focus an image after the rays are mixed in the light pipe, because this optics ensures that all rays having a same direction are from a single pixel. This in-coupling optics provides 90 to 100% of efficiency to transfer light beams. The maximum angle (902) can be up to +/−42.6 degrees if the prism is made of polycarbonate and the angle can go even higher if higher refractive index than that of polycarbonate is used. This ensures FOV over +/−30 degrees or 60 degrees.

Figure 11:
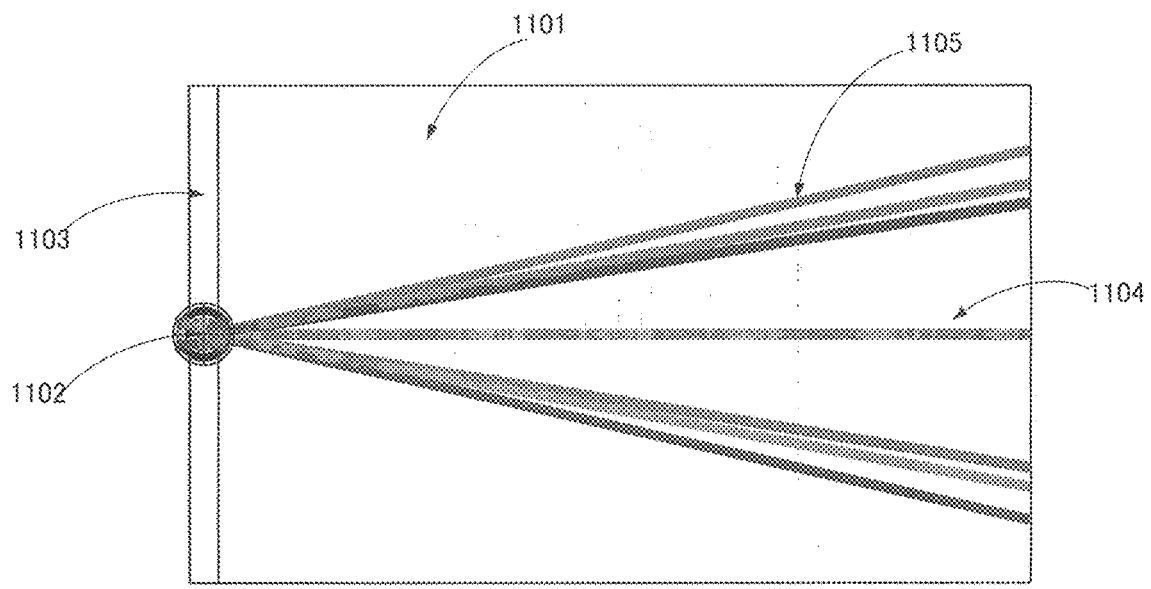
FIG. 11 illustrates the light beam trajectories from the in-coupling optics.
Figure 12:
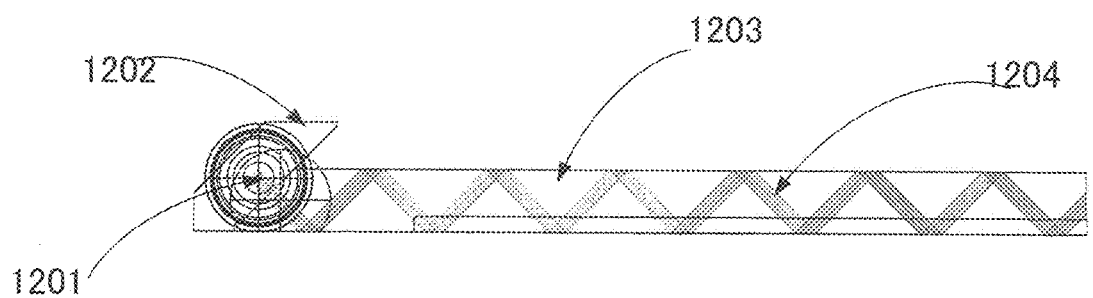
FIG. 12 illustrates an example of light pipe to lead light from the in-coupling optics without large waveguide, but with a narrow light pipe.

An exemplary embodiment of this invention of for a light pipe is shown in FIG. 12. The mirror surface (1202) of in-coupling prism is rotated 45 degrees so that all the rays from the projection lens will hit the side walls of light pipe. After the light rays are inputted in an in-coupling waveguide, the directions of the rays including 9 points (center, 4 corners and 4 edge points on x and y-axis) are shown in FIG. 11. The rays can be folded or bent about 90 degrees toward an out-coupling in this waveguide, but it requires a large area. To reduce the folding area, a light is used. However, the light pipe shown as (1203) will contains 4 different directions due to reflections by side walls and top and bottom walls. The necessary direction is only one of 4 directions. A selection mechanism is needed to select rays in the necessary direction.

Figure 13:
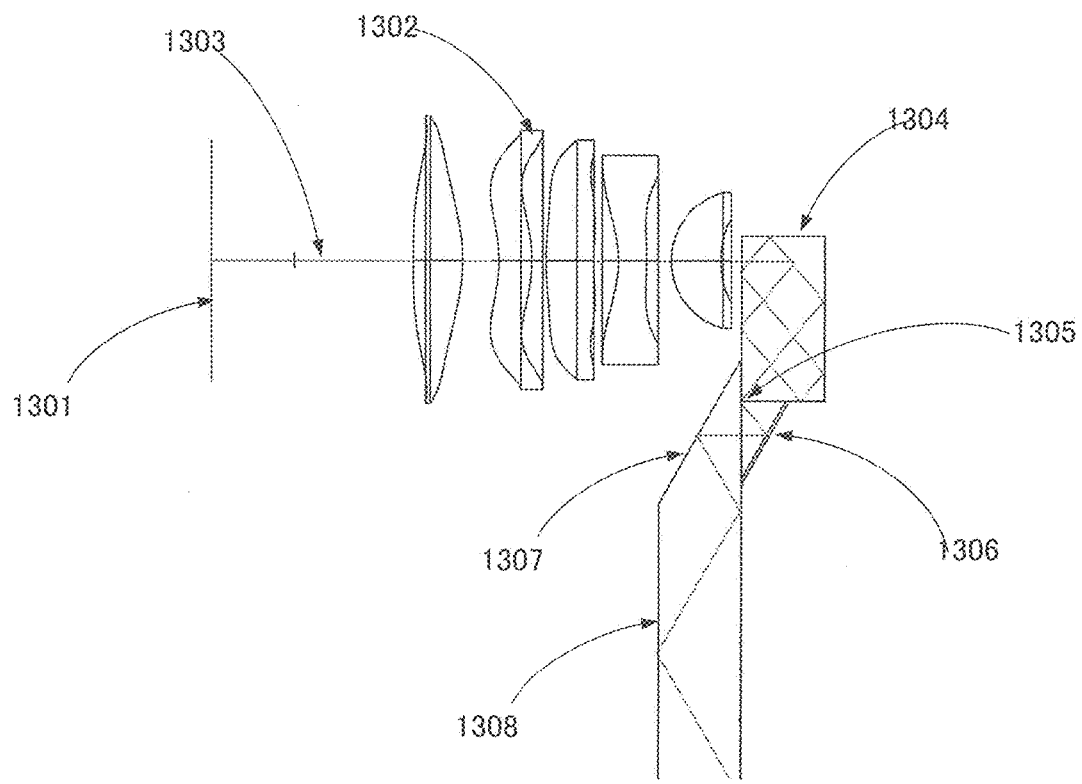
FIG. 13 exemplifies a light trajectory from the display device (1301) through the projection lens (1302), the in-coupling prism, the light pipe (1304), an opening (1305), a folding mirror (1306) and an out-coupling waveguide (1308).
Figure 14:
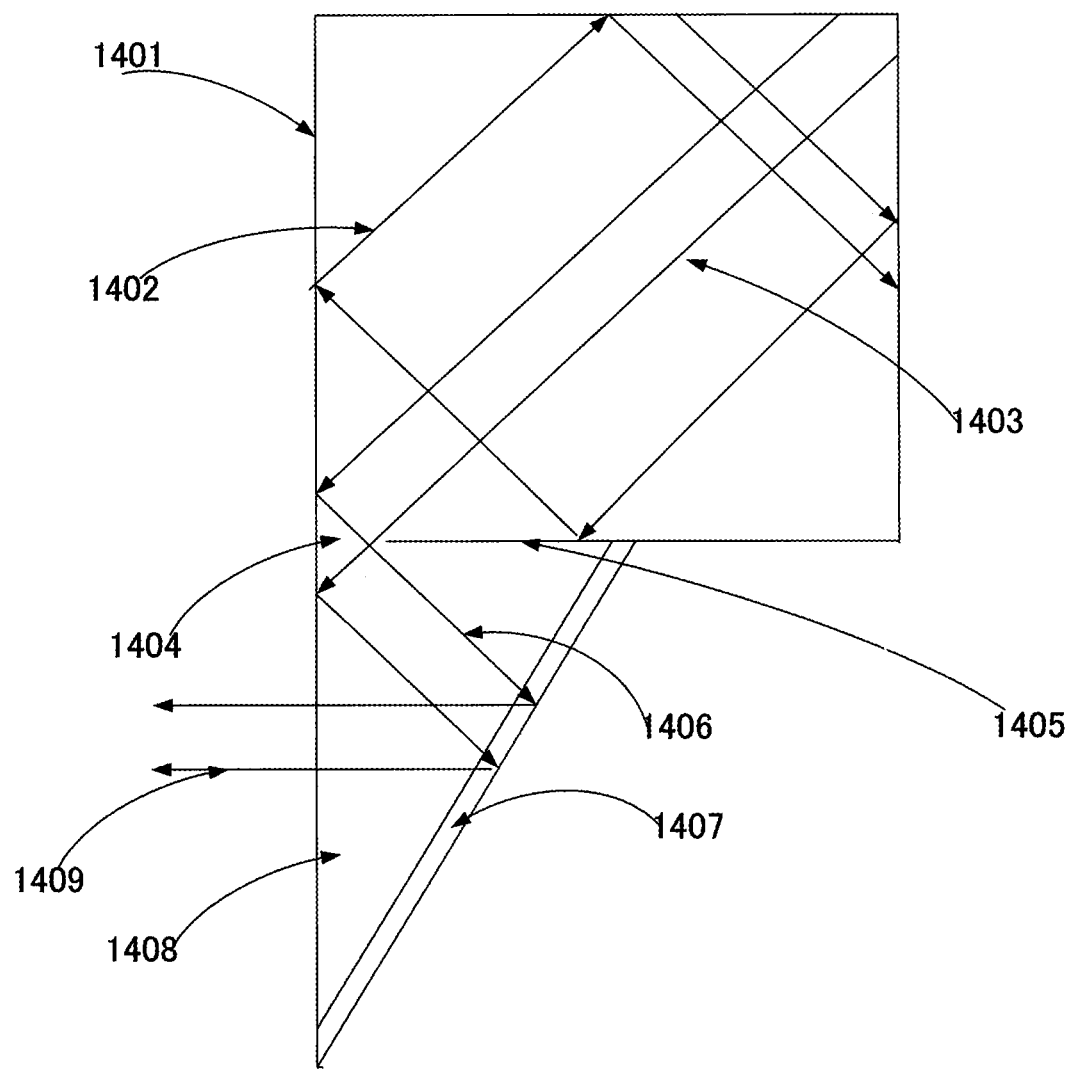
FIG. 14 illustrates the details of the light pipe, the opening and the folding mirror.
Figure 15:
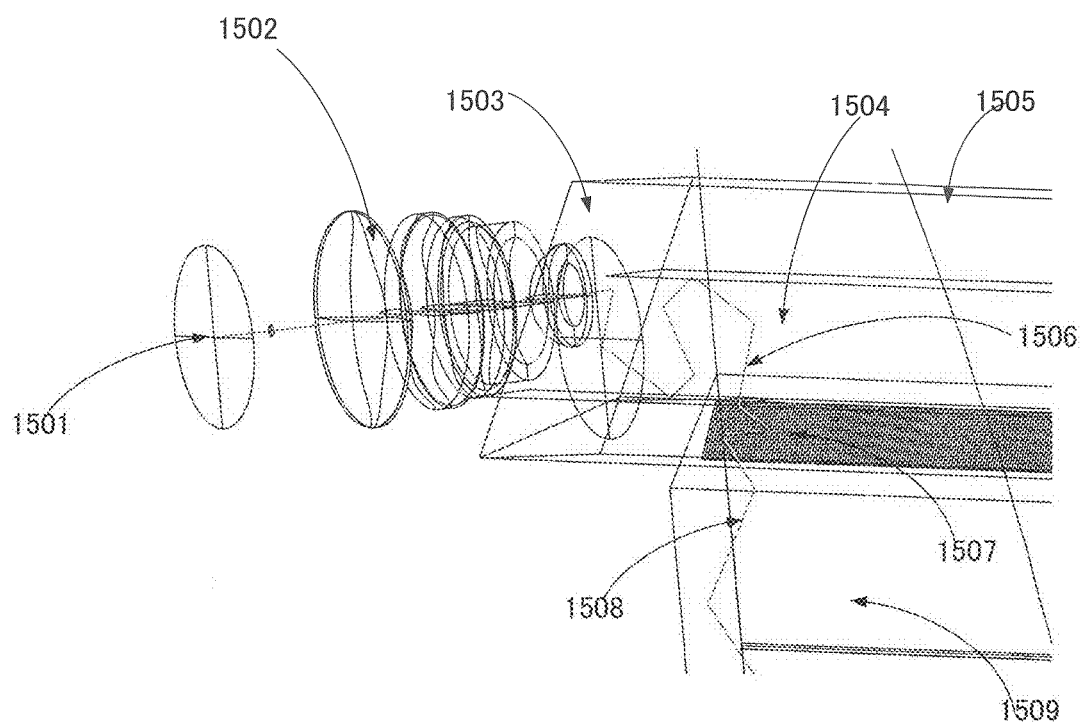
FIGS. 15 and 15A show two alternate light beam trajectories in the projecting system of this invention.
Figure 15A:
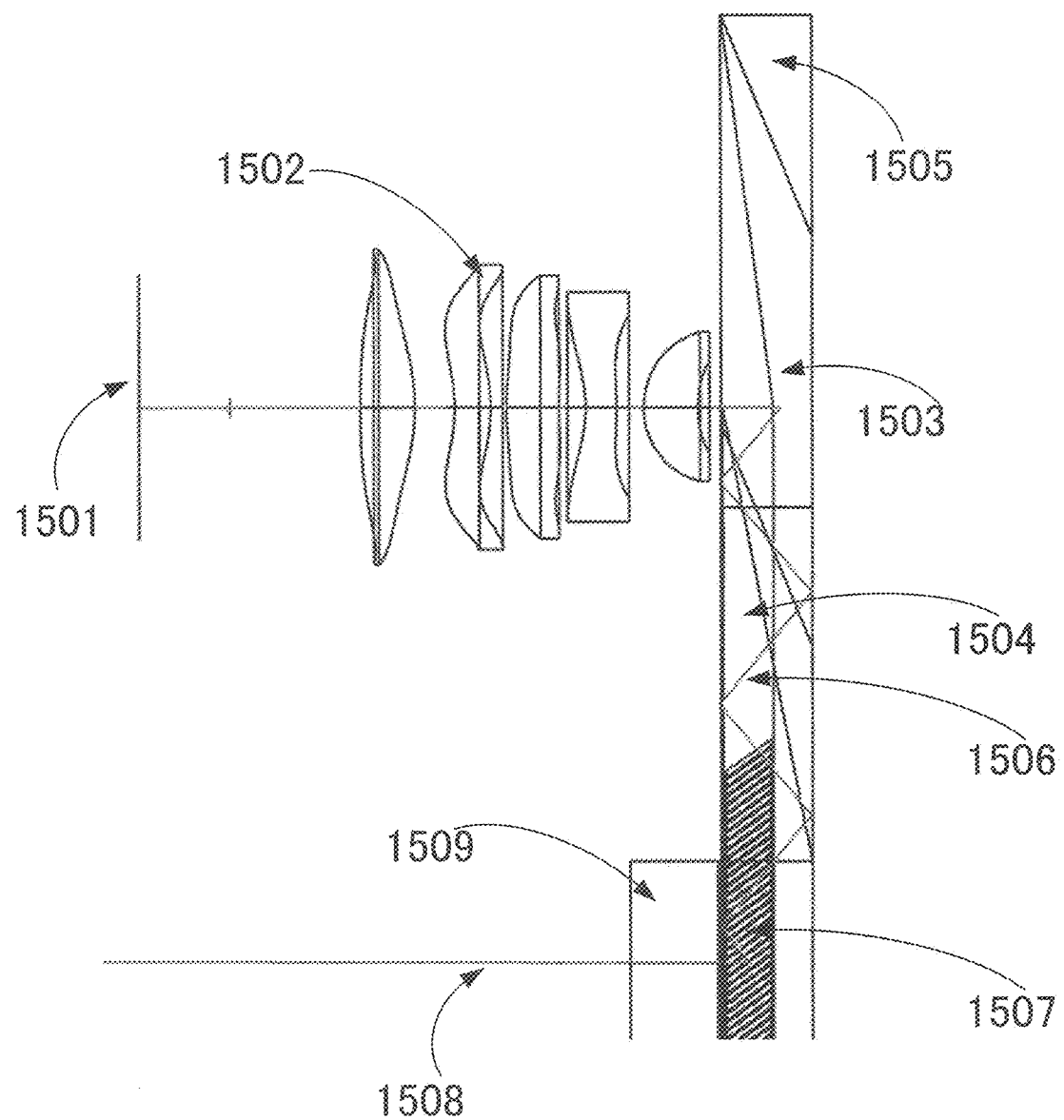

An exemplary embodiment of this invention of the selection mechanism is shown in FIG. 13 and FIG. 14. The cross-section of the light pipe (1304 and 1401) is shown. The 4 sides of light pipe are reflective by either TIR (totally internal reflection) or reflective coating (1405). The top surface of the light pipe is marked as (1401). There is an opening (1404) where only rays having the necessary direction (1406) can pass. The light rays which passed the opening (1406) will be reflected by folding mirrors (1407). The folding mirrors are saw-teeth shaped (Fresnel type) prisms (1507 in FIG. 15) and designed to reflect the rays toward an out-coupling (1308 and 1509). To obtain the uniformity of brightness through the light pipe, the size of opening is varied by location. The closer area to the in-coupling prism has smaller opening than farther area.

Figure 16:
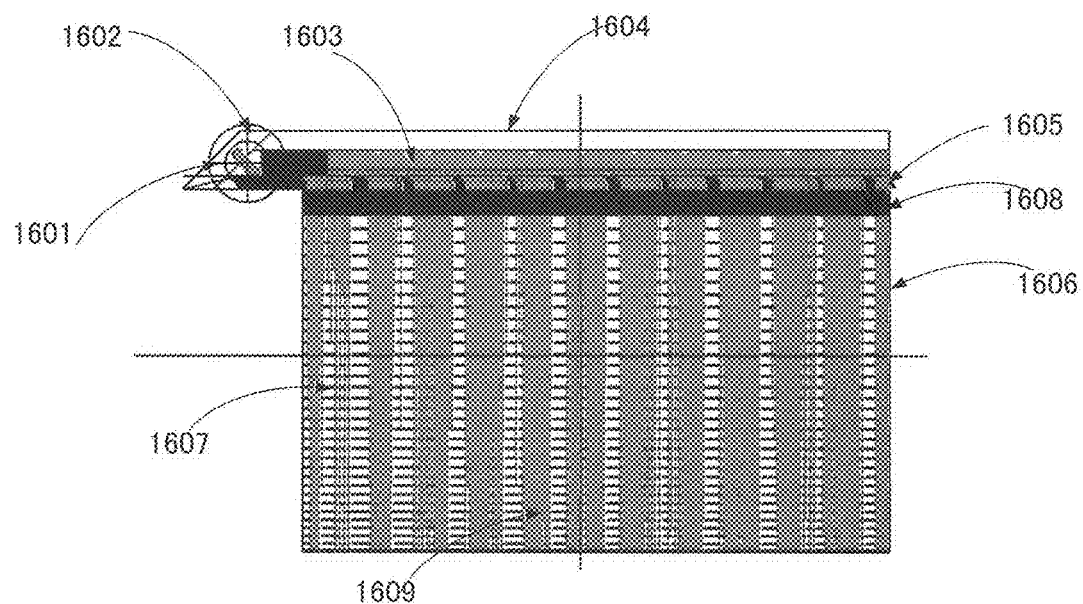
FIG. 16 shows another exemplary embodiment of this invention that shows the distribution of light rays is very uniform for the center beams throughout the entire waveguide.
Figure 17:
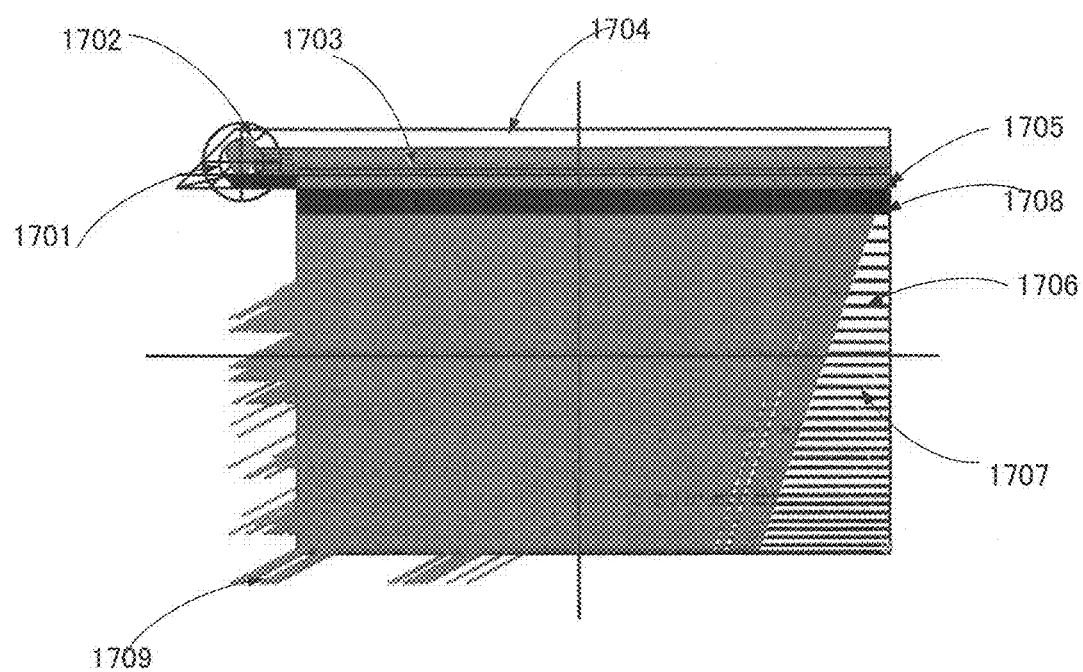
FIG. 17 shows another exemplary embodiment of this invention that shows some areas in the right-bottom rays are unilluminated area.
Figure 18:
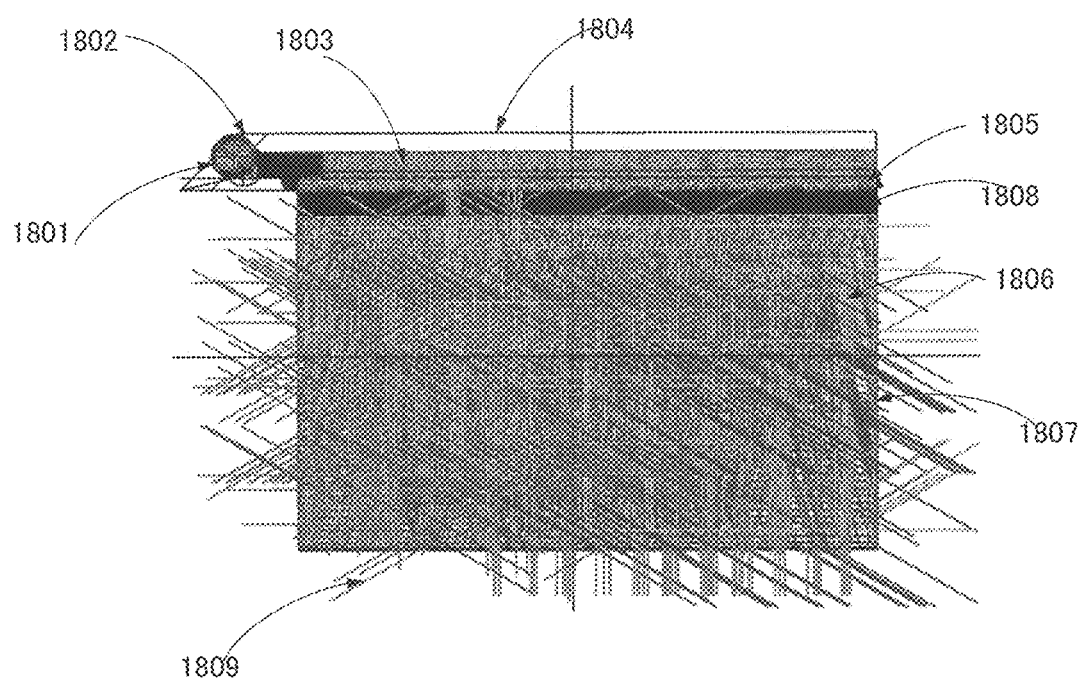
FIG. 18 shows another exemplary embodiment of this invention that shows an example of light trajectories including all the 9 points.
Figure 19:
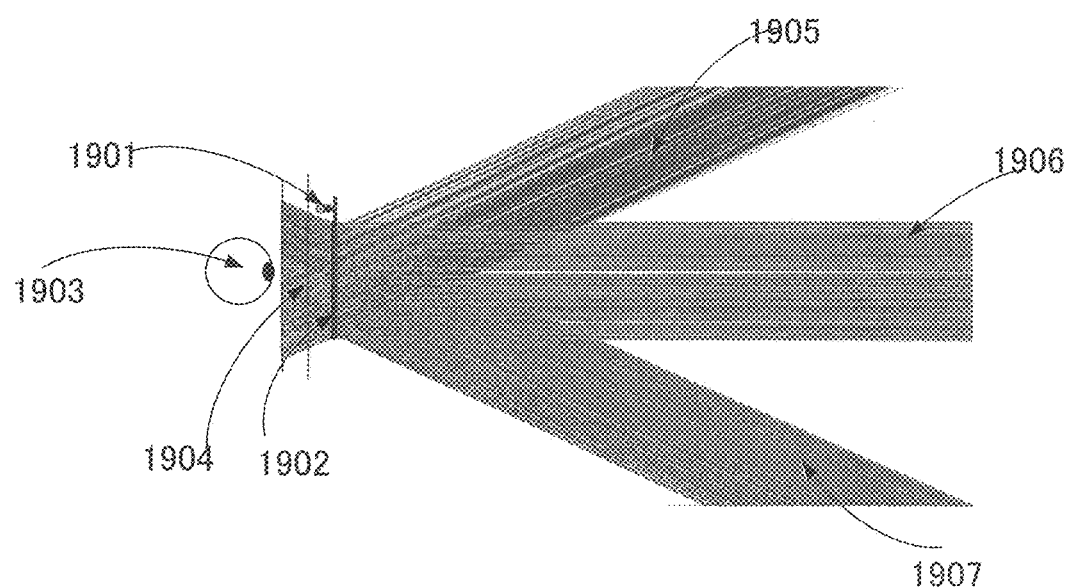
FIG. 19 shows another exemplary embodiment of this invention that shows light trajectories from top and wherein a very large eyebox is shown.

An exemplary embodiment of this invention is shown in FIG. 16. The trajectories of the rays from the center pixel are shown as (1609). A display device and projection lens (1601), an in-coupling prism (1602) which is 45 degrees rotated so that all the rays from the projection lens hit the side walls of light pipe (1603). The light rays having the same directions as the light rays before entering the light pipe are passed to the folding mirrors (1608) and reflected toward the out-coupling waveguide (1606). The simulation shown in FIG. 16 indicates the distribution of light rays is very uniform for the center beams throughout the entire waveguide. The simulation for the right-bottom rays are shown in FIG. 17 that illustrates some unilluminated area (1707). This unilluminated area limits the eye-box of this display. When an eye-ball stares at this area, the image of right-bottom is not visible, although the images in other directions are visible. The simulation in FIG. 18 shows an example of light trajectories including all the 9 points. FIG.

19 shows another exemplary embodiment of this invention that shows light trajectories from top and wherein a very large eye box is shown.

Figure 20:
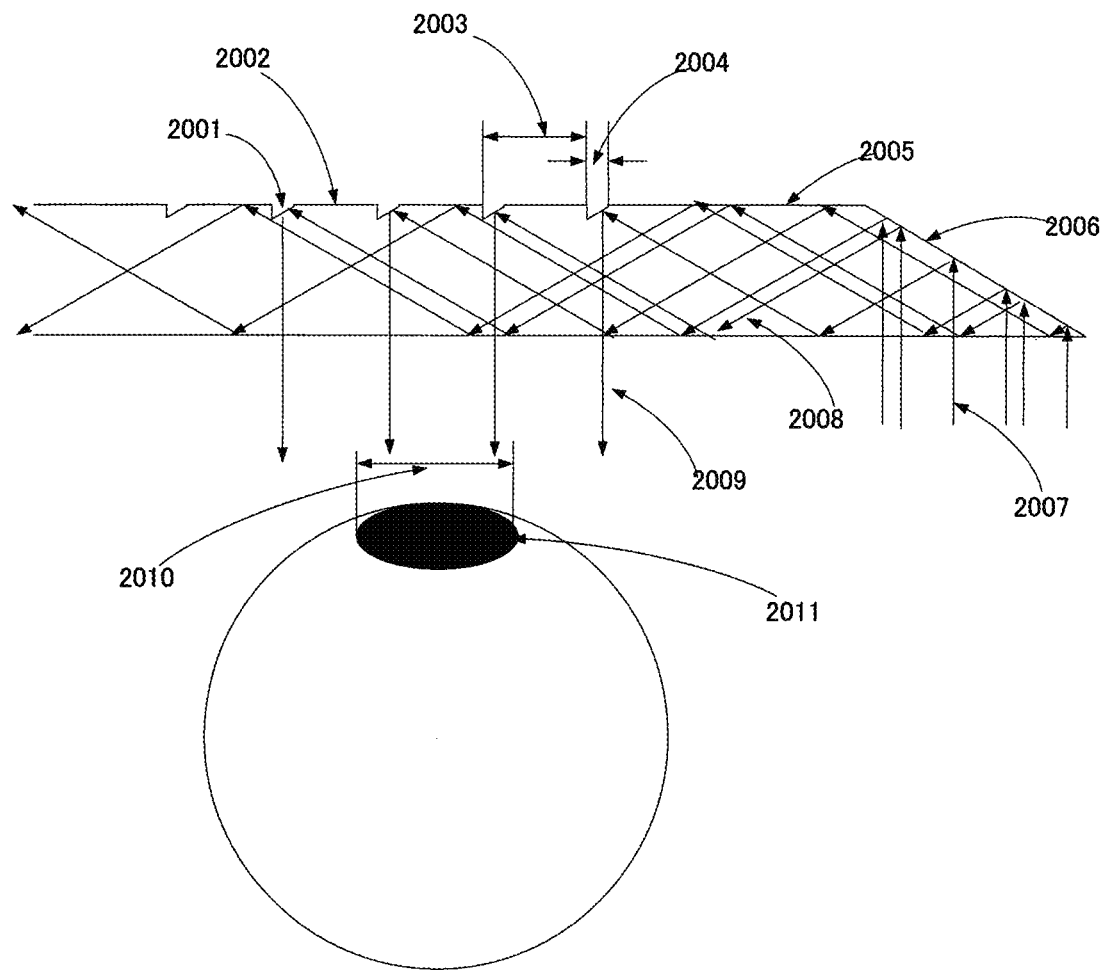
FIG. 20 shows another exemplary embodiment of this invention that shows an out-coupling waveguide.

An exemplary embodiment of this invention is shown in FIG. 20 showing an out-coupling waveguide. The light rays (2007) are inputted into another prism (2006) which is a part of the out-coupling waveguide and are reflected inside. The light rays (2008) are reflected by the top and bottom walls of the waveguide in multiple times and some of them reach Fresnel mirrors (2001) and reflected toward a viewer's eye. The pitch of mirror (2003) and the width (2004) are selected to ensure the uniformity of brightness throughout the entire waveguide. The mirror portion (2004) is coated with reflecting material, because all the rays are not necessarily within TIR (totally internal reflection).

Figure 21:
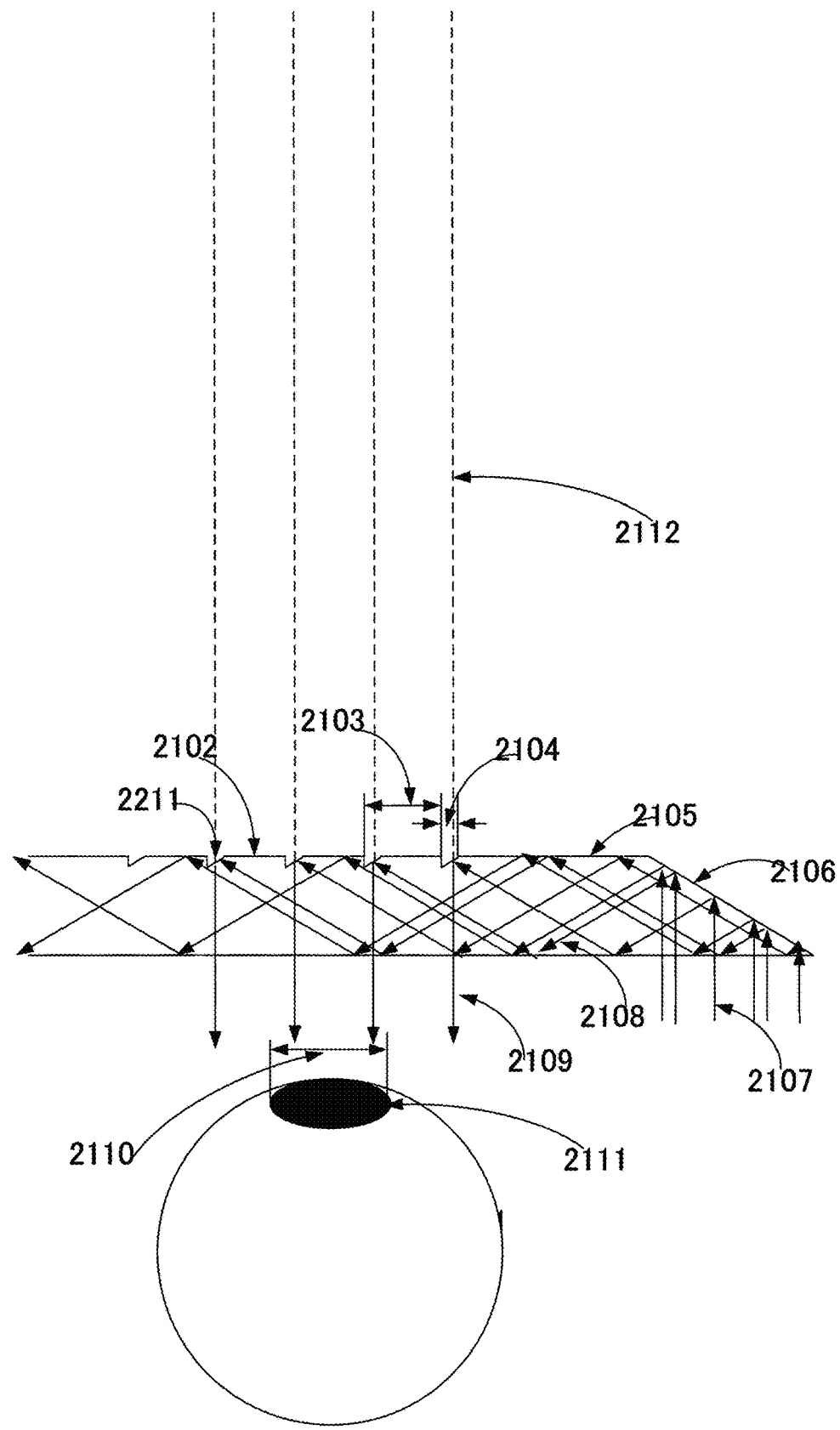
FIG. 21 shows another exemplary embodiment of this invention that shows the angles of all the Fresnel mirrors are equal, the distance of image is infinite.
Figure 22:
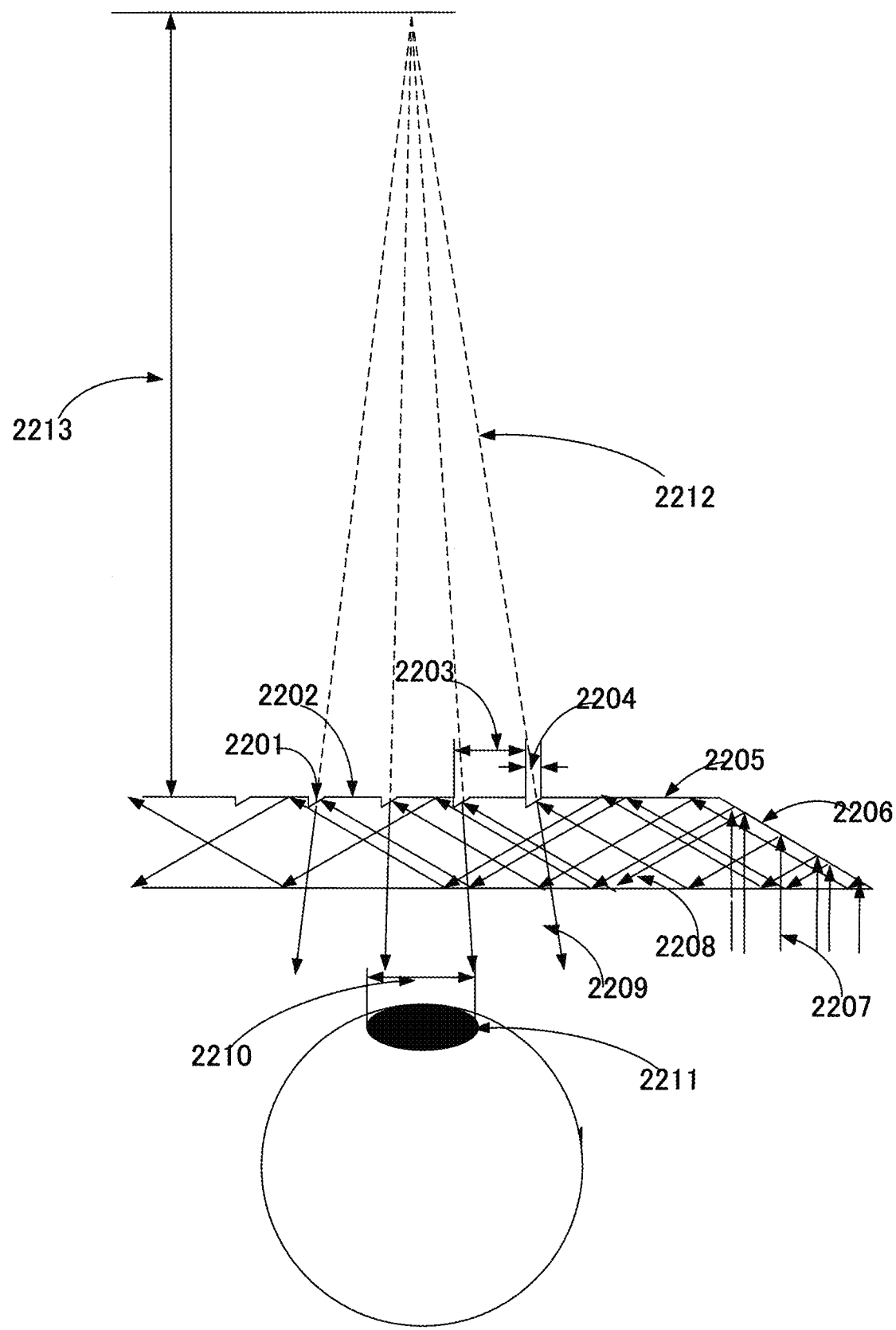
FIG. 22 shows another exemplary embodiment of this invention that shows a finite distance of image is displayed by varying the angles of Fresnel mirrors by location.

An exemplary embodiment of this invention is shown in FIG. 21 and FIG. 22. If the angles of all the Fresnel mirrors are equal, the distance of image will be infinite as shown in FIG. 21. A finite distance of image can be obtained by varying the angles of Fresnel mirrors by location as shown in FIG. 22.

Figure 23:
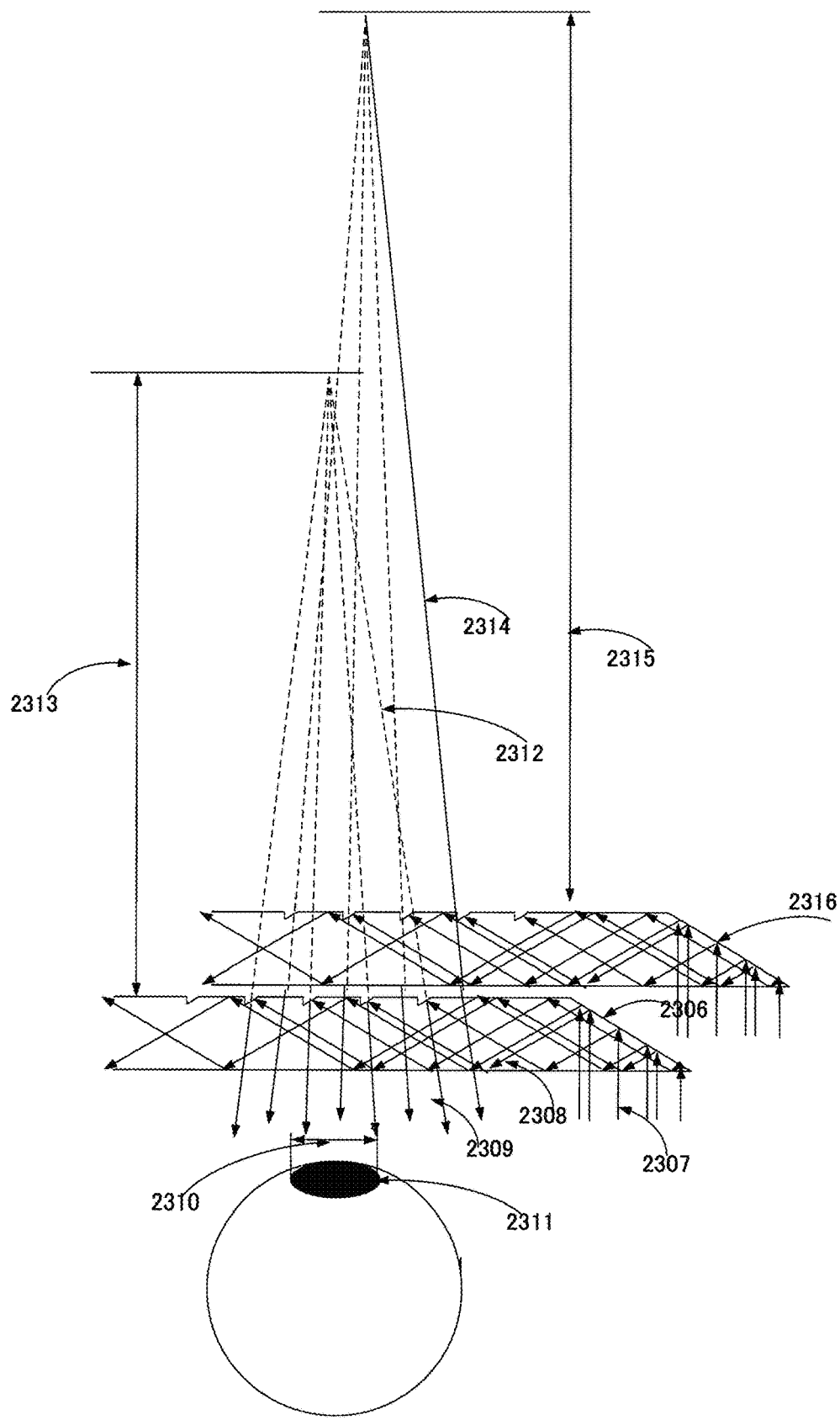
FIG. 23 shows another exemplary embodiment of this invention that shows adding additional set(s) of display system(s), dual or multiple distances of images is achieved.

An exemplary embodiment of this invention is shown in FIG. 23. By adding additional set(s) of display system(s) as shown in FIG. 23, dual or multiple distances of images can be achieved.

Figure 24:
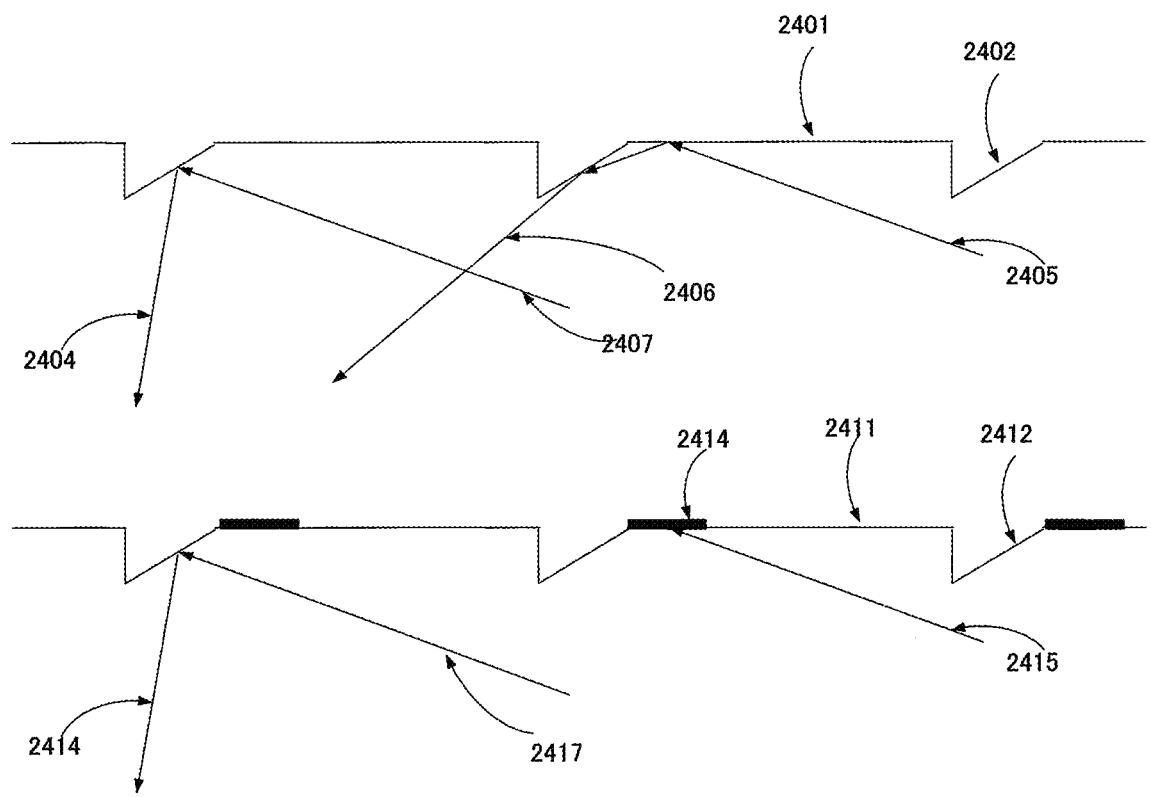
FIG. 24 shows Fresnel mirror can cause unwanted reflection as ghost images that must be eliminated.

An exemplary embodiment of this invention is shown in FIG. 24. Fresnel mirror can cause unwanted reflection (2405 and 2406) as shown in FIG. 24 and this unwanted reflection can cause so called ghost images and must be eliminated. This type of unwanted reflection happens only in limited area in front of mirror and this area can be coated with light absorbing material (2414).

Figure 25:
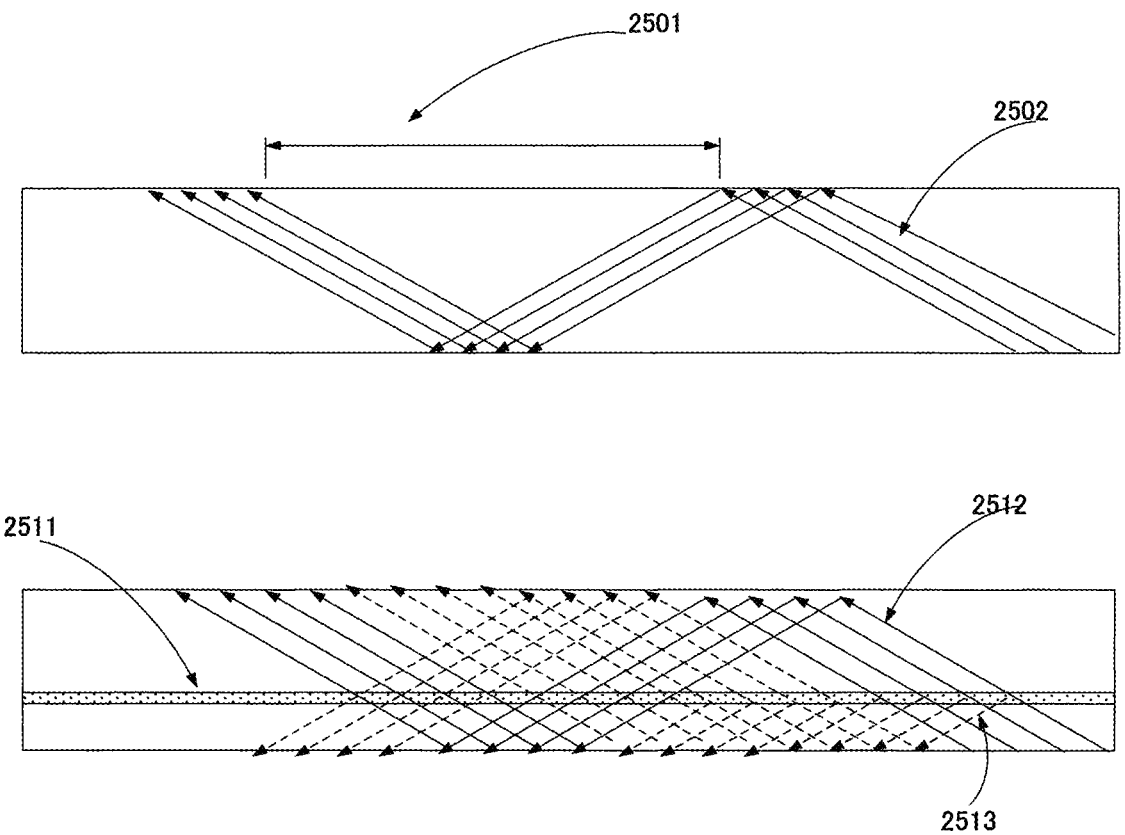
FIG. 25 shows another exemplary embodiment wherein some unilluminated area affecting the visibility of image is minimized.

An exemplary embodiment of this invention is shown in FIG. 25. The light trajectories shown in FIG. 25 indicate some unilluminated area (2501) which can affect the visibility of image and has to be minimized. A partially reflective layer is inserted in the light pipe and/or out-coupling waveguide or added on top of light pipe and/or out-coupling waveguide. The partially reflective layer can be achieved by coating or inserting a layer of material(s) having different refractive index (indices).

Figure 26:
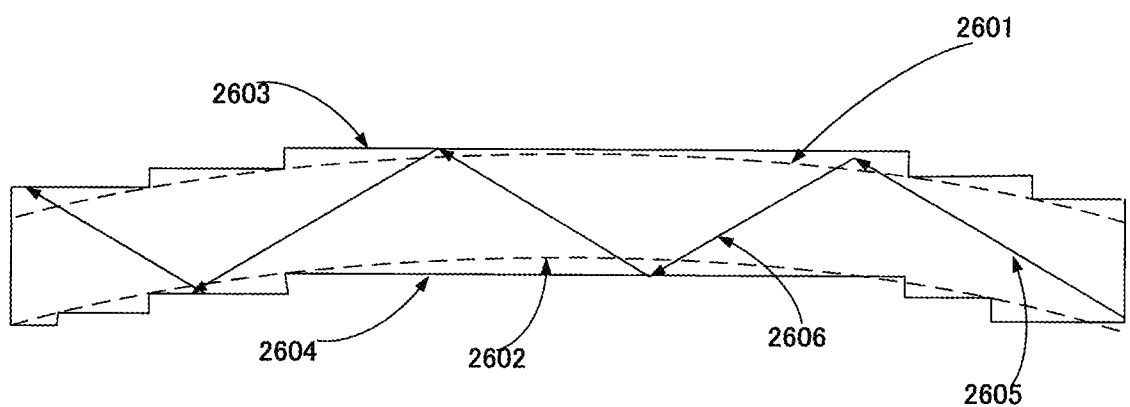
FIG. 26 shows another exemplary embodiment of this invention dial shows a curved eye glass of waveguide achieved without changing the reflection angles by introducing steps on the surface of waveguide to keep the same reflection angles.

An exemplary embodiment of this invention is shown in FIG. 26. Viewers may want a curved eyeglass far waveguide. This can be achieved without changing the reflection angles as shown in FIG. 26 by introducing steps on the surface of waveguide to keep the same reflection angles. To avoid the visibility of grooves, the height of steps must be minimized.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

I claim:

1. A display system comprising:
a display device projects a plurality of light rays each as a pixel of an image to a projection lens set for transmitting the light rays through an in-coupling prism to propagate in a light pipe wherein the light pipe having a designed shape with reflective coating for transmitting the light rays in multiple directions inside the light pipe and the light pipe further having a predesigned opening to transmit only the light rays having a same direction as the light rays from the in-coupling prism to folding mirrors wherein the light rays are reflected from the light pipe to an out-coupling waveguide; and
the folding mirrors comprises saw-teeth shaped mirror surfaces for reflecting and bending the light rays about ninety degrees for projecting to the out-coupling waveguide wherein the out-coupling waveguide further comprises saw-teeth shaped Fresnel mirrors for reflecting the light beams toward the eye of a viewer to present the image formed by the pixels projected from the display device with a field of view over sixty degrees.

2. The display system of claim 1 wherein:
the projection lens set is telecentric wherein the light rays projected to the projection lens set from each of the pixels having a principal ray and the principal ray is parallel to the optical axis of the projection lens set.

3. The display system of claim 1 wherein:
the in-coupling prism comprises a reflective surface for reflecting the light rays from the projection lens set into the light pipe wherein a normal vector of the reflective surface is between 15 and 45 degrees with respect to an optical axis of the projection lens set.

4. The display system of claim 1 wherein:
the in-coupling prism comprises a reflective surface for reflecting the light rays from the projection lens set into the light pipe wherein a normal vector of the reflective surface is rotated to form an angle between 30 and 60 degrees with respect to a long side of the light pipe.

5. The display system of claim 1 wherein:
a refractive index of the in-coupling prism and light pipe is over 1.4.

6. The display system of claim 1 wherein:
the designed shape of the light pipe has a rectangular cross-section with surfaces of the light pipe coated with the reflective coating as a totally internal reflection (TIR) light pipe having the opening for the light rays to transmit out toward the folding mirrors and wherein the opening is disposed along a longitudinal side of the light pipe.

7. The display system of claim 5 wherein:
the opening on the light pipe is adjusted to project a uniform brightness of the image presented to the viewer over an entire range of the field of view.

8. The display system of claim 1 wherein:
the folding mirrors are tilted between 15 and 45 degrees with respect to a top surface of the light pipe and a normal vector of the folding mirror is set to reflect the light ray parallel to an optical axis of the projection lens toward a direction substantially perpendicular to a top surface of the light pipe.

9. The display system of claim 1 wherein:
the saw-teeth shaped Fresnel mirrors reflecting the light rays toward the eye of a viewer to present the image formed by the pixels projected from the display device with an eye-box as large as 15 mm and resolution as high resolution as 4K with compact size to fit in an eyeglass.

10. The display system of claim 1 wherein:
the out-coupling waveguide further comprises a slant side constituting a prism with a normal vector of the slant side between 15 and 45 degrees relative to the top surface of the light pipe to project the light rays from the folding mirrors into the out-coupling waveguide.

11. The display system of claim 1 wherein:
the out-coupling waveguide further constitutes an optical combiner to provide an eye relief for the viewer up to 15 mm.

12. The display system of claim 1 wherein:
the out-coupling waveguide has multiple saw-teeth shaped mirrors to reflect the light rays projected from the folding mirrors toward the eye of viewer and the out-coupling waveguide further comprises a flat region to reflect the light beams by the TIR (totally internal reflection) coating and further comprises a transparent portion to transmit an external light for the viewer.

13. The display system of claim 12 wherein:
the flat region adjacent to the saw-teeth shaped mirrors further comprise light absorbing areas to avoid dual reflections.

14. The display system of claim 1 wherein:
the light pipe is coated with a partially reflective coating to reduce unilluminated areas.

15. The display system of claim 1 wherein:
the surface of the out-coupling waveguide has a curved envelope of multiple flat surfaces to reflect internally reflected light rays along same angles as the light rays reflected from a flat surface in the out-coupling waveguide.

16. The display system of claim 1 wherein:
the multiple saw-teeth shaped mirrors of the out-coupling waveguide having varying angles to generate the image with the light rays focused at a finite distance.

17. The display system of claim 1 wherein:
multiple sets of the display system are overlaid to project multiple images in multiple distances for viewing by the viewer.

18. The display system of claim 1 wherein:
the out-coupling waveguide is coated with a partially reflective coating to reduce unilluminated areas.

* * * * *